United States Patent [19]

Shields et al.

[11] Patent Number: 4,584,442

[45] Date of Patent: Apr. 22, 1986

[54] WELDING CABLE REEL SYSTEM

[76] Inventors: David A. Shields, 24709 Ebelden Ave., Newhall, Calif. 91321; James R. Davis, 8824 Cache St., Leona Valley, Calif. 93550

[21] Appl. No.: 540,789

[22] Filed: Oct. 11, 1983

[51] Int. Cl.[4] .................. H02G 11/02; H01B 17/14
[52] U.S. Cl. .................... 191/12.2 R; 174/138 D; 248/121; 384/492; 384/548
[58] Field of Search .............. 174/138 D; 191/12.2 R; 242/7.17, 54 R; 248/121, 122, 158, 159; 384/490, 492, 548

[56] References Cited

U.S. PATENT DOCUMENTS

| | | | |
|---|---|---|---|
| 2,324,711 | 7/1943 | Lofgren | 191/12.2 R |
| 2,860,197 | 11/1958 | Kost | 191/12.2 R |
| 2,977,427 | 3/1961 | Benjamin | 191/12.2 R |
| 3,102,765 | 9/1963 | Newman | 191/12.2 R |
| 3,144,232 | 8/1964 | Smootz | 248/122 X |
| 3,172,510 | 3/1965 | Lee et al. | 191/12.2 R |
| 3,258,545 | 6/1966 | Bernard, Jr. | 191/12.2 R |
| 4,291,639 | 9/1981 | Burdick | 174/138 D X |

FOREIGN PATENT DOCUMENTS

| | | | |
|---|---|---|---|
| 1171078 | 5/1964 | Fed. Rep. of Germany | 191/12.2 R |
| 3122325 | 12/1982 | Fed. Rep. of Germany | 191/12.2 R |
| 461134 | 12/1913 | France | 191/12.2 R |

Primary Examiner—Robert B. Reeves
Assistant Examiner—David F. Hubbuch
Attorney, Agent, or Firm—Lyon & Lyon

[57] ABSTRACT

A welding cable reel system including an insulated reel mounted on an electrically conducting bearing assembly, the assembly in turn mounted on a hub which is rotatably mounted on a shaft which is connected to an insulated support post. A cable being connected to the hub so as to receive current which is transmitted to the support post and carried through the shaft and hub to the cable.

9 Claims, 5 Drawing Figures

U.S. Patent   Apr. 22, 1986   Sheet 2 of 2   4,584,442
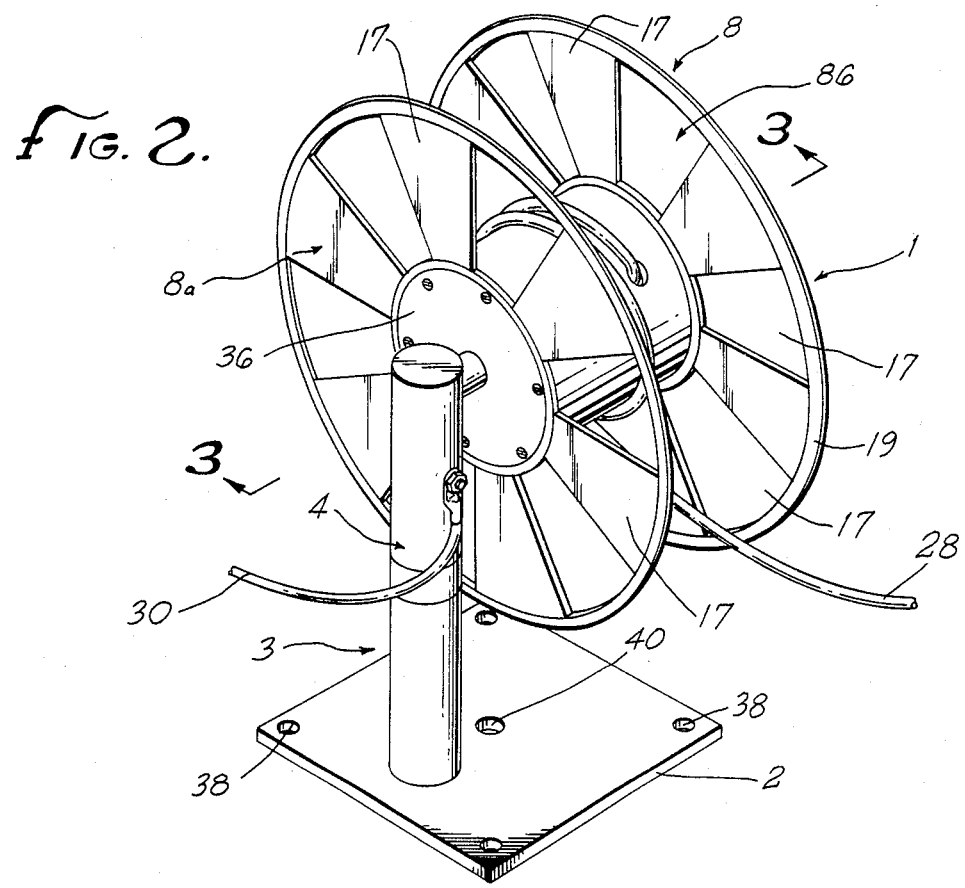
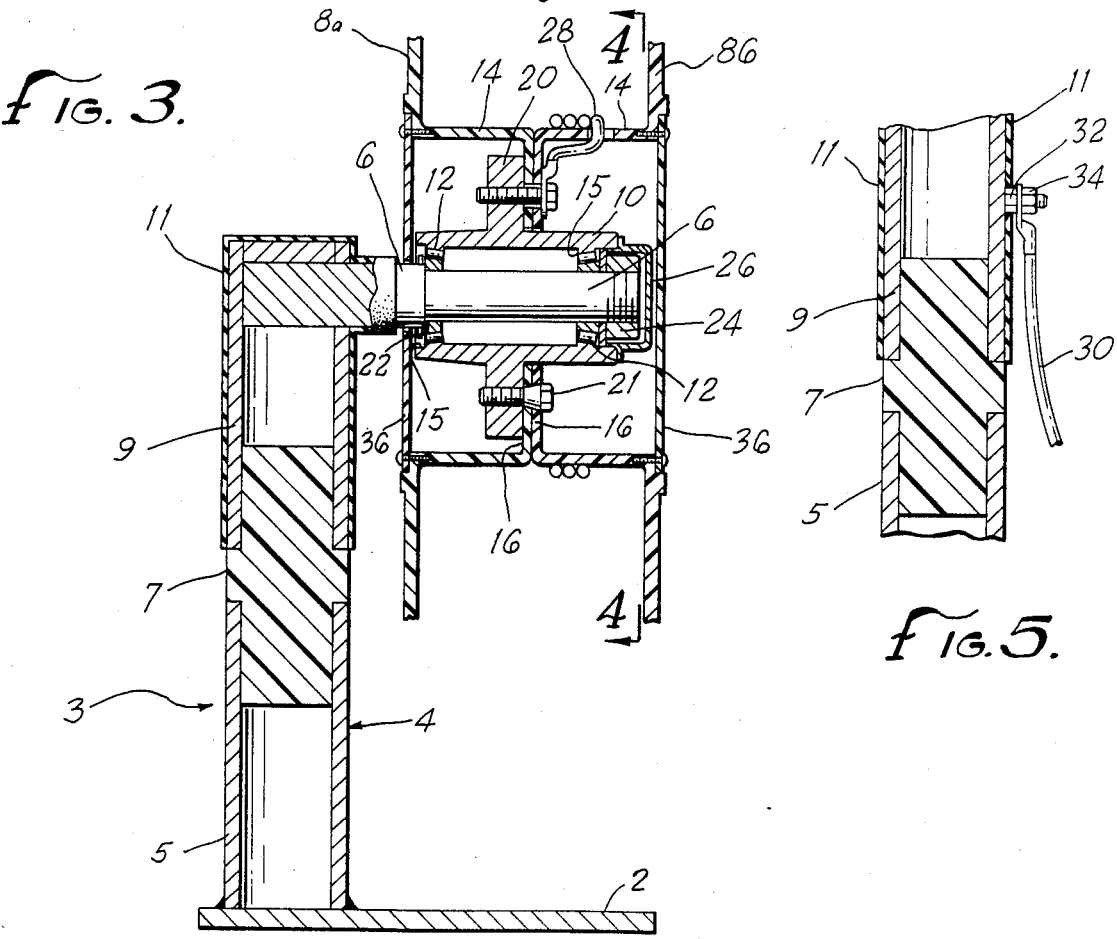

WELDING CABLE REEL SYSTEM

BACKGROUND OF INVENTION

This invention relates to the field of cable reels, more particularly the field of welding cable reels.

Heretofore, welders desiring to collect or store their welding cables have had to gather and arrange the cables by hand or utilize large, cumbersome and expensive reel mechanisms. The gathering and storage of the cables by hand has proven to be inadequate, especially where the welder is working at a location remote from the welding machine, thereby necessitating the usage of a long length of welding cable, wherein the cables may easily become knotted or tangled while being gathered. Prior reel systems for utilization with welding cables have proven to be inadequate due to their great expense and large bulky size.

There therefore exists a need for an inexpensive, compact, portable welding cable reel system.

SUMMARY OF INVENTION

This invention provides a hand operated winding and storage reel system for use with welding cables. The reel system incorporates a pair of hand operated winding reels, each reel being mounted on a hub attached to an insulated support post. One of the support posts is connected to the positive lead on a welding machine, while the second support post is connected to the welding machine ground.

One end of a length of welding cable passes through the body of the reel and is connected to the hub and the cable wound about the reel. Current is transmitted from the welding machine to the welding cable by passing up the insulated support post and through the hub to the attached cable. To avoid current being passed through the reels themselves, said reels are constructed from a non-conductive material.

Thus, it is an object of this invention to provide a hand-operated welding cable reel system.

It is a further object of this invention to provide an inexpensive welding cable reel system.

These and other uses and objects of this invention will appear hereinafter.

BRIEF DESCRIPTION OF DRAWINGS

FIG. 2 is an oblique detailed view of a single welding cable reel assembly.

FIG. 3 is a side cross-section view of a welding cable reel assembly.

FIG. 5 is a partial cross-sectional view of the support post.

DETAILED DESCRIPTION OF THE PREFERRED EMBODIMENT

Figure 1:
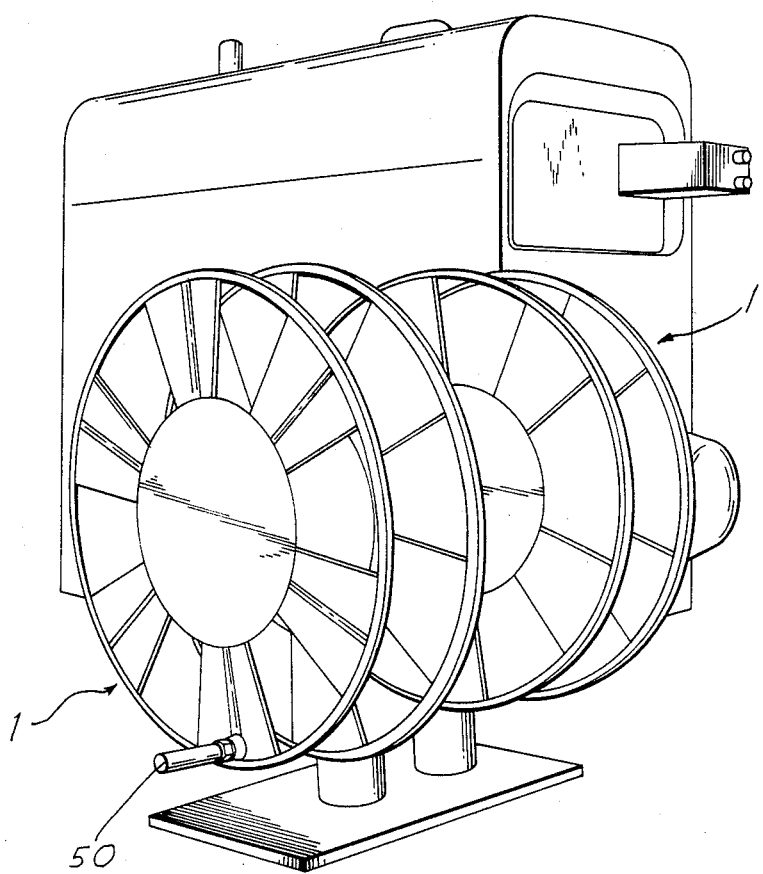
FIG. 1 is an oblique view of the welding cable reel system.
Figure 4:
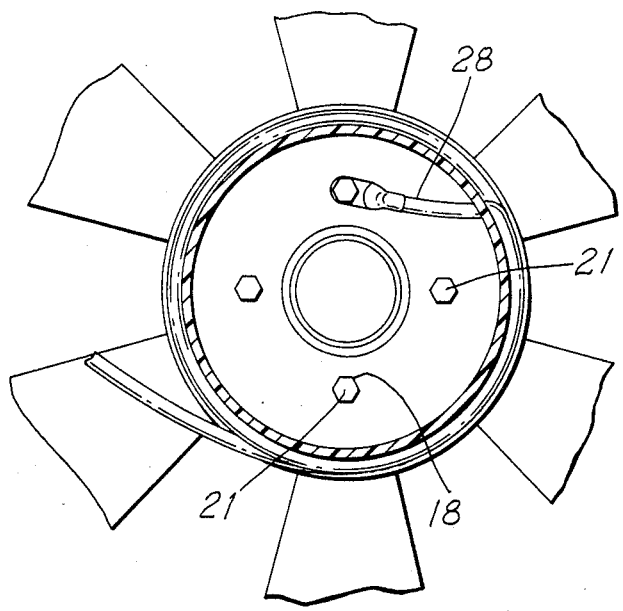
FIG. 4 is a partial frontal cross-sectional view of the hub and reel.

The invention is shown in a perspective view in FIG. 1. Two reel assemblies 1 are paired side by side. The construction of the reel assembly 1 may be understood by reference to FIGS. 2 and 3 wherein a single reel assembly 1 is shown.

The reel assembly 1 is comprised of a support post assembly 3 having a base plate 2 having a support post 4 mounted thereon. In the preferred embodiment both the base plate 2 and the support post 4 are steel and the base of the support post 4 is welded to the base plate 2 at a point offcenter from the center point of the base plate 2. A shaft 6 extends horizontally outward from near the top of the support post 4 extending over the center point of the base plate 2 as shown in FIGS. 2 and 3. In the preferred embodiment the shaft 6 is composed of steel and is welded to the support post 4. In alternate embodiments the shaft 6 may be made from any suitable conductive metal.

A reel 8 is rotatably mounted on the shaft 6 by means of a hub 10 which is inserted over the exterior of shaft 6 and supported by front and rear roller bearings 12 set within standard bearing seats 15 located in the front and rear areas of the interior walls of the hub 10. The reel 8 is composed of two matching reel body sections 8a, b bolted to the hub 10 as shown in FIG. 3. Each reel body section 8a, 8b has a hollow cylindrical center section 14 closed at one end by a hub plate 16. Each hub plate 16 has an aperture having the same configuration as the hub 10, but being of a slightly greater diameter, located at its center point and four mounting holes 18 equally spaced in a circular pattern between the edge of the aperture and the wall of the center section 14. Cable guide arms 17 extend outward radially from the open end of the center section 14. The ends of the guide arms 17 are connected by means of a circular ring 19.

The reel body sections 8a, b are inserted onto the hub 10 such that the hub plates 16 are adjacent to each other as shown in FIG. 3. They are then bolted by means of hub mounting bolts 21 to a circular hub flange 20 which extends radially outward from the hub 10. In the preferred embodiment the circular hub flange 20 has threaded apertures passing through the body of the flange 20, said aperatures being aligned with the mounting holes 18 located in the reel body sections 8a, b.

In operation the reel 8, mounted on the hub 10, may be rotated about the outer portion of the shaft 6 for the purposes of either reeling in or unreeling the attached welding cable by means of a handle 50 which is bolted to or fastened by any other suitable means to one of the guiding arms 17 of the front body section 8b. The outer section of the shaft 6 is of a narrower diameter than the inner portion of the shaft 6 adjacent to the support post 4. The shoulder 22 created by the junction of the differing diameter sections of the shaft 6 acts as a stop against the hub 10 and rear bearing 12 and prevents its movement towards the support post 4 beyond the position of the shoulder 22. In order to maintain the hub 10 at this position on the shaft 6, a nut 24 is threaded onto the threaded exterior end of the shaft 6. A dust cap 26 may be inserted over the nut 24 sealing the exterior end of the hub 10.

In order to allow for the proper conduction of current the roller bearings 12 upon which the hub 10 rotates are lubricated with any one of a variety of suitable conductive lubricants.

The operation of the above described reel assembly 1 will now be discussed. A welding cable 28 is attached to the reel assembly 1 by means of the insertion of one end of the cable 28 through an aperture located in the center section 14 of one of the reel body sections 8a, b. In a preferred embodiment the aperture is located in the center section 14 of the front reel section 8b as shown in FIGS. 2 and 3. The end of the cable 28 inserted through said aperture is equipped with any suitable connecting device so as to enable the end of the cable to be attached to one of the mounting bolts 21 connecting the reel body sections 8a, b to the hub flange 20. In a preferred embodiment the connector is a flat plate section having an aperture located through its centerpoints of sufficient diameter to allow the insertion of the threaded section of the mounting bolt 21 through the aperture. The end of the cable is thereby attached to the hub flange 20 as shown in FIG. 3 by inserting the mounting bolt through the cable attachment through the apertures in the body sections 8a, b and screwing it into the aperture in the hub flange 20.

The reel assembly 1, may then be connected to a welding machine by means of a connecting cable 30. As shown in FIGS. 2 and 5 the connecting cable 30 is attached to the upper portion of the support post 4. In the preferred embodiment a steel bolt 32 is welded to the exterior of the upper portion of the support post 4 as shown in detail in FIG. 5. The end of the connector cable, which is preferably equipped with a connector similar to the connector utilized to attach to welding cable 28 to the hub section is inserted over the end of the bolt, and a nut 34 is threaded thereto locking the connecting cable to the support post 4. Current from the welding machine may then be transmitted to the reel assembly via the connecting cable 30. The current is then transmitted through the upper portion of the support post 4 to the shaft 6. The current then passes along the shaft 6 and is transmitted through the roller bearings 12 to the hub 10. The current is then transmitted from the hub flange 20 to the welding cable 28 by means of the mounting bolt 21. The transmission of current from the shaft 6 to the hub 10 is enhanced by means of the conductive lubricant used to lubricate the roller bearings 12 mounted within the body of hub 10.

In order to insulate the reel assembly 1 and prevent accidental grounding the support post 4 is comprised of a hollow lower cylinder 5, an insulating plug 7 and a hollow upper cylinder 9. The lower cylinder 5 is mounted on the base plate 2. The insulating plug 7, which may be constructed from any suitable non-conducting insulating material, such as nylon, is press-fitted into the cylinder 5. The upper cylinder 9 is then press-fitted atop the insulating plug 7.

In the preferred embodiment the insulating plug 7 is a cylindrical section having a circular flange extending radially outward from its mid-point. The cylindrical section is of a slightly greater diameter than the inner diameter of the upper and lower cylinders, 9 and 5 respectively, said upper and lower cylinders having identical exterior and inner diameters. The depth of the insulating plug flange is equal to the thickness of the walls of the upper and lower cylinders. The plug 7 being of a softer material than the cylinders may be press-fitted within each cylinder.

The assembled support post assembly 4 is shown in detail in FIGS. 3 and 5. The insertion of the insulating plug 7 between the upper and lower cylinders, 9 and 5, insures that the current delivered to the reel assembly via the connector cable 30, which is connected to the upper cylinder 9 by means of bolt 32 as described above, passes from the upper cylinder 9 to the shaft 6 and outward through the hub 10 to the cable 28. No current is passed to the lower cylinder 5 and accompanying base plate 2. Thus the reel assembly is insulated by plug 7 from whatever support means the assembly is mounted on. The exterior of the upper cylinder 9 and the portion of the shaft 6 adjacent to the upper cylinder 9 are also insulated by coating them with a protective insulating material 11. In the preferred embodiment an approximately ⅛ inch thick layer of protective rubber coating is applied to the upper cylinder and shaft section by means of a standard hot-dip process.

In the preferred embodiment the reel body sections 8a, b are also constructed out of a non-conductive material. In one preferred embodiment the sections are constructed from any suitable molded plastic material. Cover plates 36 may be attached by any suitable means to the open end of the body cylinders 14 as shown in FIGS. 1, 2 and 3. These covers may be utilized to reduce or limit dirt or other debris or the weather elements from coming in contact with the hub 10. As shown in FIG. 3, a cover plate to be mounted on the rear body section 8a, must have a center aperture of slightly greater diameter than the diameter of the shaft 6 so as to allow the insertion of the cover plate 36 over the shaft prior to the insertion of the hub 10 onto the shaft.

The above described reel assembly may be utilized to carry either live current, i.e. a positive cable, or to carry the ground cable. In normal operation these reel assemblies 1 will be utilized in pairs comprising a welding cable reel system, one reel carrying the positive cable the other reel carrying the ground cable. In such situations two reels will normally be mounted adjacent to each other as shown in FIG. 1. The base plates 2 of each reel assembly are equipped with two mounting means. As shown in FIG. 2 mounting apertures 38 are located in each corner of the base plate 2. These mounting apertures 38 allow for the insertion of a bolt or other suitable device through the apertures and into whatever support means it is desired to place the reel assembly upon. When so mounted the reel assembly will be in a fixed position facing in a single direction. It is common in the welding industry, however, that the location of the welder may change frequently or is such that the welding machine and accompanying reel assemblies cannot be pointed in the exact direction that the welder is operating. Therefore a need exists for a reel assembly which may be rotated in various directions to allow for usage while the welder moves from one location to another. Accordingly the base plate 2 is equipped with a center pivot hole 40 as shown in FIG. 2. When it is desired that the reel assemblies 1 be capable of being rotated the center pivot hole is utilized to retain the reel assembly 1 in position on whatever support means is being utilized and not the mounting holes 38. This allows for the pivoting of the reel assembly about its center point to enable it to be pointed in whatever direction the welder desires by means of the insertion of a bolt or peg or other suitable object through the pivot hole 40 so that it engages whatever support means the base plate 2 is resting upon.

In the preferred embodiment the reels 8 are constructed of plastic material in either a red or a black color. The red colored reels being utilized for the positive cable and the black reels being utilized for the ground cables. These colors are commonly used throughout the industry to designate a live wire as opposed to a ground wire. The usage of these colors with the respective reels enables the welder who may be a significant distance from the welding machine and the reel assemblies to easily determine whether he is handling a live cable or a ground cable.

While embodiments and applications of this invention have been shown and described in great detail, it should be apparent to those skilled in the art that many more modifications are possible without departing from the inventive concepts herein. The invention thereof is not to be restricted except in the spirit of the appended claims.

What is claimed is:

1. A welding cable reel system comprising:
a reel;
an electrically conductive hub and bearing assembly;
an electrically conductive hub shaft; and
a support post assembly wherein the reel is connected to the electrically conductive hub and bearing assembly, said hub and bearing assembly being mounted on said electrically conductive hub shaft which is connected to the upper portion of the support post assembly and extends horizontally outward from the support post assembly such that the combined reel and hub and bearing assembly may be rotated about the shaft wherein the electrically conductive hub and bearing assembly is comprised of a hollow metal cylindrical hub having flange extending radially outwardly from the exterior wall of the hub, said flange having a plurality of equally spaced threaded mounting apertures passing through the body of the flange and a pair of electrically conductive roller-type bearings wherein the electrically conductive roller-type bearings are seated within the hollow center portion of the cylindrical hub, one bearing being located near each end of the hub.

2. A welding cable reel system as in claim 1 wherein the reel is color coded.

3. A welding cable reel system as in claim 1 wherein the electrically conductive hub and bearing assembly is lubricated with an electrically conductive lubricant.

4. A welding cable reel system as in claim 1 wherein the reel is comprised of two body sections, each body section having a hollow central cylindrical section, closed at one end by a hub plate, each said hub plate having an aperture at its center point, said hub plate aperture being of the same configuration but having a slightly greater diameter than the outer diameter of the hub and bearing assembly, each said hub plate further having a plurality of mounting holes equally spaced about the hub plate, said mounting holes corresponding to said mounting apertures in the hub flange and wherein the two body sections are attached to the hub flange by inserting threaded bolts through the mounting holes and screwing them into the mounting apertures such that the hub plates are adjacent to each other when the body sections are mounted on the hub, and wherein the hollow central cylindrical section of at least one of the body sections has an aperture through its side wall sufficient to allow the insertion through said side wall aperture of a length of cable.

5. A welding cable reel system as in claim 1 wherein the support post assembly is comprised of a metal base plate, a lower support cylinder, a hollow metal upper support cylinder, a cable connecting means, and an insulating plug wherein the lower support cylinder is attached to the base plate and the insulating plug fits within and separates the lower support cylinder and the upper support cylinder, the insulating plug being cylindrical in shape and having an upper and lower section, the uncompressed diameter of the upper and lower sections each having a diameter slightly greater than the inside diameters of the upper and lower support cylinders, respectively, and further having a circular flange extending radially outward from the plug at the junction of the upper and lower sections of the plug, said flange separating the upper and lower support cylinders.

6. A welding cable reel system as in claim 5 wherein the lower support cylinder is attached to the base plate at a point off-center from the center point of the base plate and a pivot hole is provided through the base plate at its center point.

7. A welding cable reel system as in claim 5 wherein the hub shaft is welded to the side wall of the upper support cylinder, the diameter of the portion of the shaft adjacent to the free end of the shaft being smaller than the diameter of the portion of the shaft adjacent to the upper cylinder, the junction of the two portions of the shaft forming a shoulder which acts as a stop preventing movement of the hub and bearing assembly towards the upper support cylinder beyond the shoulder.

8. A welding cable reel system as in claim 5 wherein the cable connecting means is comprised of a threaded bolt, the head end of which is welded to the side wall of the upper support cylinder such that the threaded end of the bolt extends radially outward from the upper support cylinder and a nut which is threaded onto the bolt to secure a cable connector.

9. A welding cable reel system as in claim 7 wherein the exterior of the upper support cylinder and the larger diameter portion of the shaft are coated with an insulating material.

* * * * *